(12) United States Patent
Park et al.

(10) Patent No.: US 12,410,309 B2
(45) Date of Patent: Sep. 9, 2025

(54) POLYMER COMPLEX

(71) Applicant: LG Chem, Ltd., Seoul (KR)

(72) Inventors: Chee Sung Park, Daejeon (KR); Minsung Park, Daejeon (KR); Kwang Seoung Jeon, Daejeon (KR); Harim Jeon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 740 days.

(21) Appl. No.: 17/767,315

(22) PCT Filed: May 31, 2021

(86) PCT No.: PCT/KR2021/006743
§ 371 (c)(1),
(2) Date: Apr. 7, 2022

(87) PCT Pub. No.: WO2021/242069
PCT Pub. Date: Dec. 2, 2021

(65) Prior Publication Data
US 2022/0372276 A1    Nov. 24, 2022

(30) Foreign Application Priority Data

May 29, 2020   (KR) .................. 10-2020-0065204
Jul. 13, 2020   (KR) .................. 10-2020-0086346
(Continued)

(51) Int. Cl.
*C08L 23/12*       (2006.01)
*C08L 67/02*       (2006.01)
(Continued)

(52) U.S. Cl.
CPC ............. *C08L 23/12* (2013.01); *C08L 67/02* (2013.01); *D01D 5/423* (2013.01); *D01F 2/28* (2013.01);
(Continued)

(58) Field of Classification Search
CPC ...... C08L 23/12; C08L 67/02; C08L 2205/03; C08L 2205/16; C08L 1/02; C08L 25/06;
(Continued)

(56) References Cited

U.S. PATENT DOCUMENTS 3,997,503 A   12/1976   Henman et al.
4,374,178 A   2/1983   Kulkarni et al.
(Continued)

FOREIGN PATENT DOCUMENTS

CN   101647077 A   2/2010
CN   102317542 A   1/2012
(Continued)

OTHER PUBLICATIONS

Oromiehie, "Chemical Modification of Polypropylene by Maleic Anhydride: Melt Grafting, Characterization, and Mechanism," 2014, International Journal of Chemical Engineering and Applications, 5, 2, 117-122. (Year: 2014).*
(Continued)

*Primary Examiner* — Robert S Jones, Jr.
*Assistant Examiner* — Joshua Caleb Bledsoe
(74) *Attorney, Agent, or Firm* — Lerner David LLP

(57) ABSTRACT

The present disclosure relates to a polymer complex containing microcellulose fibers comprising nanofibrils and fine particles; and a polymer matrix comprising a polyester resin. According to the present disclosure, there is provided a polymer complex capable of exhibiting excellent mechanical properties while being environmentally friendly by including cellulose fibers as a reinforcing material.

15 Claims, 6 Drawing Sheets

(30) Foreign Application Priority Data

| May 31, 2021 | (KR) | 10-2021-0069785 |
|---|---|---|
| May 31, 2021 | (KR) | 10-2021-0069786 |
| May 31, 2021 | (KR) | 10-2021-0069787 |

(51) Int. Cl.

| D01D 5/42 | (2006.01) |
|---|---|
| D01F 2/28 | (2006.01) |
| D06M 11/83 | (2006.01) |
| D06M 13/188 | (2006.01) |
| D06M 13/503 | (2006.01) |
| D21H 11/18 | (2006.01) |
| D06M 101/06 | (2006.01) |

(52) U.S. Cl.
CPC .......... *D06M 11/83* (2013.01); *D06M 13/188* (2013.01); *D06M 13/503* (2013.01); *D21H 11/18* (2013.01); *C08L 2205/03* (2013.01); *C08L 2205/16* (2013.01); *D06M 2101/06* (2013.01); *D10B 2201/00* (2013.01); *D10B 2505/02* (2013.01)

(58) Field of Classification Search
CPC ....... C08L 77/00; C08L 101/00; D01D 5/423; D01F 2/28; D01F 2/00; D01F 11/02; D06M 11/83; D06M 13/188; D06M 13/503; D06M 2101/06; D21H 11/18; D10B 2201/00; D10B 2505/02; C08K 3/013; C08K 3/08; C08K 3/36
See application file for complete search history.

(56) References Cited

U.S. PATENT DOCUMENTS

| 5,536,369 | A | 7/1996 | Norlander |
| 6,270,883 | B1 | 8/2001 | Sears et al. |
| 6,730,249 | B2 | 5/2004 | Sears et al. |
| 8,722,773 | B2 | 5/2014 | Hamilton et al. |
| 9,698,336 | B2 | 7/2017 | Kim et al. |
| 10,450,452 | B2 | 10/2019 | Lummerstorfer et al. |
| 10,794,006 | B2 | 10/2020 | Phipps et al. |
| 2002/0000683 | A1 | 1/2002 | Sears et al. |
| 2006/0036012 | A1* | 2/2006 | Hayes ............ D01F 1/10 524/445 |
| 2009/0065975 | A1 | 3/2009 | Sain et al. |
| 2010/0203313 | A1 | 8/2010 | Olsson et al. |
| 2011/0175252 | A1 | 7/2011 | Liu et al. |
| 2012/0136146 | A1 | 5/2012 | Heiskanen et al. |
| 2012/0160433 | A1 | 6/2012 | Vehvilainen et al. |
| 2012/0208933 | A1 | 8/2012 | Hamilton et al. |
| 2013/0209772 | A1 | 8/2013 | Sandstrom et al. |
| 2014/0182797 | A1 | 7/2014 | Paltakari et al. |
| 2014/0272397 | A1 | 9/2014 | Kim et al. |
| 2015/0357099 | A1 | 12/2015 | Galland et al. |
| 2016/0208153 | A1 | 7/2016 | Hede et al. |
| 2017/0058419 | A1 | 3/2017 | Kim et al. |
| 2017/0072472 | A1 | 3/2017 | Isogai |
| 2017/0306562 | A1 | 10/2017 | Phipps et al. |
| 2018/0094181 | A1 | 4/2018 | Tominaga et al. |
| 2019/0112478 | A1 | 4/2019 | Peace et al. |
| 2019/0112479 | A1 | 4/2019 | Peace et al. |
| 2019/0127556 | A1 | 5/2019 | Maclean et al. |
| 2019/0241725 | A1 | 8/2019 | Lummerstorfer et al. |
| 2020/0040531 | A1 | 2/2020 | Thitiwutthisakul et al. |
| 2020/0062921 | A1 | 2/2020 | Hara et al. |
| 2020/0157318 | A1* | 5/2020 | Seo ............ C08L 67/04 |
| 2020/0199330 | A1 | 6/2020 | Maclean et al. |
| 2020/0216624 | A1 | 7/2020 | Hamilton et al. |
| 2020/0238333 | A1 | 7/2020 | Itoh et al. |
| 2020/0248405 | A1 | 8/2020 | Momin et al. |
| 2020/0306794 | A1 | 10/2020 | Kuramochi et al. |
| 2020/0398308 | A1 | 12/2020 | Okazaki et al. |
| 2020/0399832 | A1 | 12/2020 | Phipps et al. |
| 2021/0025109 | A1 | 1/2021 | Hasegawa et al. |
| 2021/0087713 | A1 | 3/2021 | Fukui et al. |
| 2021/0102341 | A1 | 4/2021 | Fukuoka et al. |
| 2021/0198463 | A1 | 7/2021 | Ikura et al. |
| 2021/0222006 | A1 | 7/2021 | Ono et al. |
| 2021/0261781 | A1 | 8/2021 | Gane et al. |
| 2021/0285156 | A1 | 9/2021 | Laleg et al. |
| 2022/0049071 | A1 | 2/2022 | Matsusue et al. |
| 2022/0064390 | A1 | 3/2022 | Backfolk et al. |
| 2022/0372263 | A1 | 11/2022 | Lee et al. |
| 2023/0272557 | A1 | 8/2023 | Park et al. |
| 2024/0166827 | A1 | 5/2024 | Park et al. |
| 2024/0166851 | A1 | 5/2024 | Park et al. |
| 2024/0166855 | A1 | 5/2024 | Hwang et al. |

FOREIGN PATENT DOCUMENTS

| CN | 102378777 A | 3/2012 | |
| CN | 104031366 A | 9/2014 | |
| CN | 105531345 A | 4/2016 | |
| CN | 108589266 A | 9/2018 | |
| CN | 109162086 A | 1/2019 | |
| CN | 109790681 A | 5/2019 | |
| CN | 110041564 A | 7/2019 | |
| CN | 110139959 A | 8/2019 | |
| CN | 110382601 A | 10/2019 | |
| CN | 111452352 A | 7/2020 | |
| CN | 107793711 B | 9/2020 | |
| CN | 107793708 B | 11/2020 | |
| EP | 2236545 A1 | 10/2010 | |
| EP | 2554588 A1 | 2/2013 | |
| EP | 3441436 A1 | 2/2019 | |
| JP | H8259844 A | 10/1996 | |
| JP | B194241 B2 | 7/2001 | |
| JP | 3704280 B2 | 10/2005 | |
| JP | 2010143992 A | 7/2010 | |
| JP | 2010221622 A | 10/2010 | |
| JP | 2011088997 A | 5/2011 | |
| JP | 2012007247 A | 1/2012 | |
| JP | 2012087199 A | 5/2012 | |
| JP | 2012532952 A | 12/2012 | |
| JP | 2013035903 A | 2/2013 | |
| JP | 2014-055323 A | 3/2014 | |
| JP | 2014088478 A | 5/2014 | |
| JP | 2015-513569 A | 5/2015 | |
| JP | 2015221844 A | 12/2015 | |
| JP | 2016176055 A | 10/2016 | |
| JP | 2017226754 A | 12/2017 | |
| JP | 2018193551 A | 12/2018 | |
| JP | 6446834 B2 | 1/2019 | |
| JP | 2019011523 A | 1/2019 | |
| JP | 2019500508 A | 1/2019 | |
| JP | 2019512591 A | 5/2019 | |
| JP | 2019099687 A | 6/2019 | |
| JP | 2019119983 A | 7/2019 | |
| JP | 2020007496 A * | 1/2020 | |
| JP | 2020070379 A * | 5/2020 | ............... C08K 5/12 |
| JP | 6733076 B2 | 7/2020 | |
| JP | 2020114924 A | 7/2020 | |
| JP | 2022584882 A | 11/2022 | |
| KR | 20010075598 A | 8/2001 | |
| KR | 20080086976 A | 9/2008 | |
| KR | 20090078170 A | 7/2009 | |
| KR | 20110100250 A | 11/2011 | |
| KR | 101254784 B1 | 4/2013 | |
| KR | 101407092 B1 | 6/2014 | |
| KR | 101415636 B1 | 7/2014 | |
| KR | 20160062765 A | 6/2016 | |
| KR | 20170025551 A | 3/2017 | |
| KR | 101808014 B1 | 12/2017 | |
| KR | 101979185 B1 | 5/2019 | |
| KR | 102017583 B1 | 10/2019 | |
| KR | 20200115665 A | 10/2020 | |
| KR | 102179831 B1 | 11/2020 | |
| WO | 2013120752 A1 | 8/2013 | |
| WO | 2015-170613 A1 | 11/2015 | |
| WO | 2018105174 A1 | 6/2018 | |
| WO | 2019065961 A1 | 4/2019 | |
| WO | 2019142639 A1 | 7/2019 | |

(56) References Cited

FOREIGN PATENT DOCUMENTS

| WO | 2019163873 A1 | 8/2019 |
|---|---|---|
| WO | 2019203344 A1 | 10/2019 |
| WO | 2020050286 A1 | 3/2020 |
| WO | 2020071434 A1 | 4/2020 |
| WO | 2021242069 A1 | 12/2021 |
| WO | 2023018030 A1 | 2/2023 |
| WO | 2023018031 A1 | 2/2023 |
| WO | 2023018033 A1 | 2/2023 |

OTHER PUBLICATIONS

Extended European Search Report including Written Opinion for Application No. 21813867.5 dated Nov. 3, 2022, pp. 1-6.
Extended European Search Report including Written Opinion for Application No. 21814089.5 dated Nov. 3, 2022, pp. 1-9.
Extended European Search Report including Written Opinion for Application No. 21814301.4 dated Nov. 10, 2022, pp. 1-11.
International Search Report for Application No. PCT/KR2022/003159 mailed Jun. 27, 2022, pp. 1-3.
Sahoo, K., et al., "Study of ultraviolet sensing properties of ZnO nanoparticles grown on cellulose fibers." Materials Today: Proceedings, Aug. 31, 2019, vol. 18, pp. 1156-1161.
Liu Jie et al: "Soluble soybean polysaccharide/nano zine oxide antimicrobial nanocomposite films reinforced with microfibrillated cellulose", International Journal of Biological Macromolecules, Elsevier BV, NL, vol. 159, May 16, 2020 (May 16, 2020), 793-803, XP086248301.
Extended European Search Report for Application No. 22763650.3 dated Sep. 13, 2023, 8 pgs.
Search report from International Application No. PCT/KR2021/006738, mailed Augsut 30, 2021.
Vainio, U., et al., "Copper and copper oxide nanoparticles in a cellulose support studied using anomalous small-angle X-ray scattering." The European Physical Journal D, vol. 42, Published online: Jan. 31, 2007, pp. 93-101.
Sahoo, K., et al., "ZnO-cellulose Nanocomposite Powder for Application In UV Sensors." AIP Conference Process Proceedings, vol. 1832, Issue No. 1, Published online: May 23, 2017, document No. 050090, pp. 1-3.
Search report from International Application No. PCT/KR2021/006741, mailed Sep. 9, 2021.
Search report from International Application No. PCT/KR2021/006743, mailed Sep. 15, 2021.

* cited by examiner

[FIG. 1A]
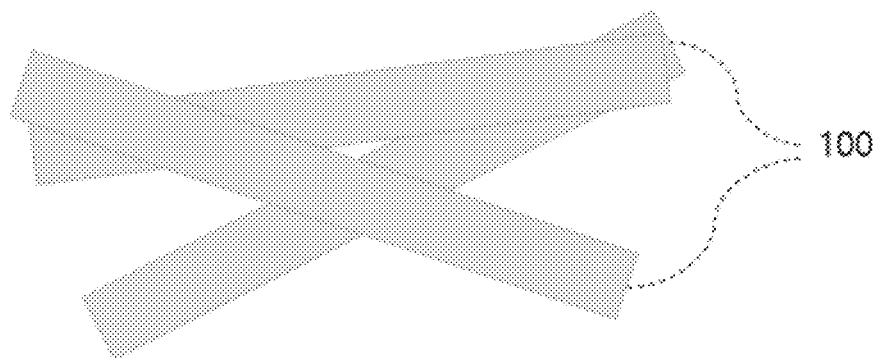
[FIG. 1B]
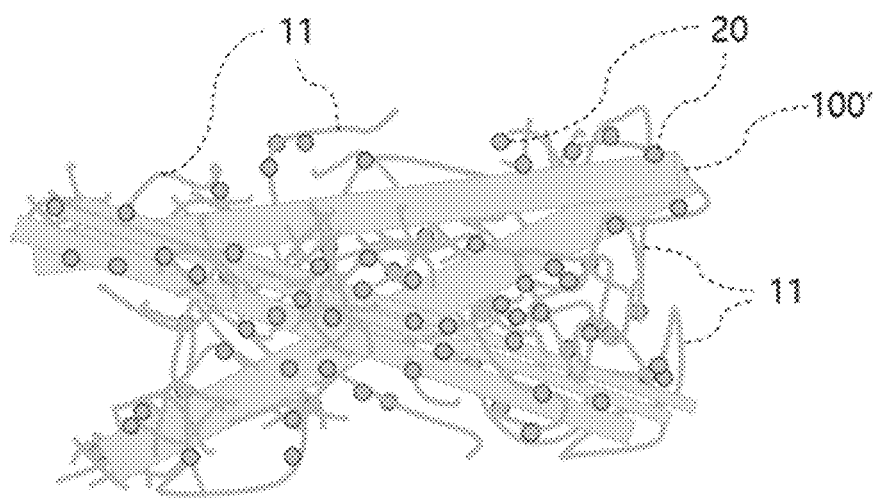

[FIG. 2]
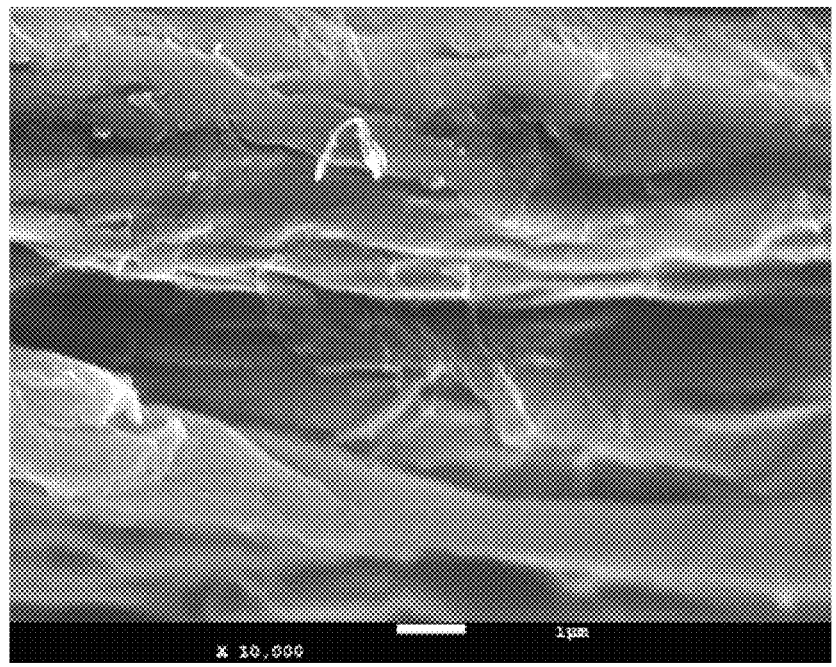
[FIG. 3]
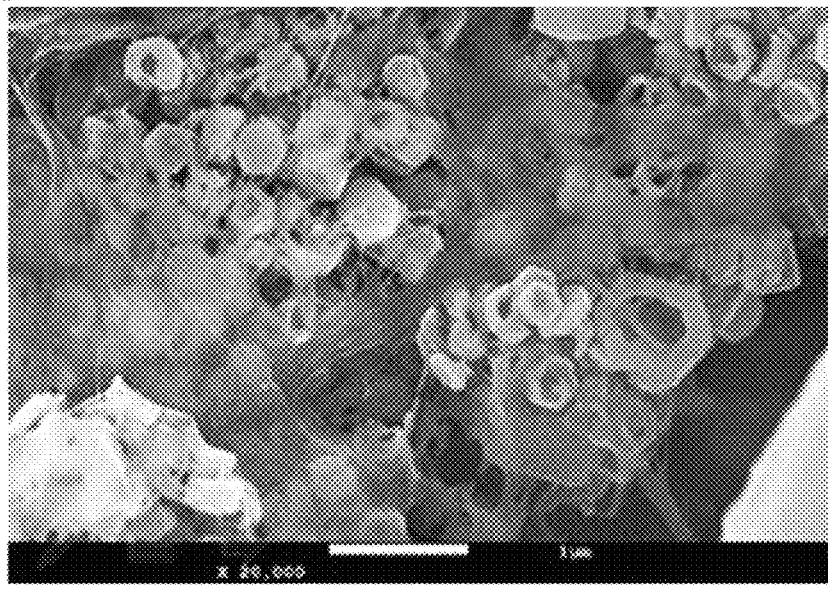

[FIG. 4]
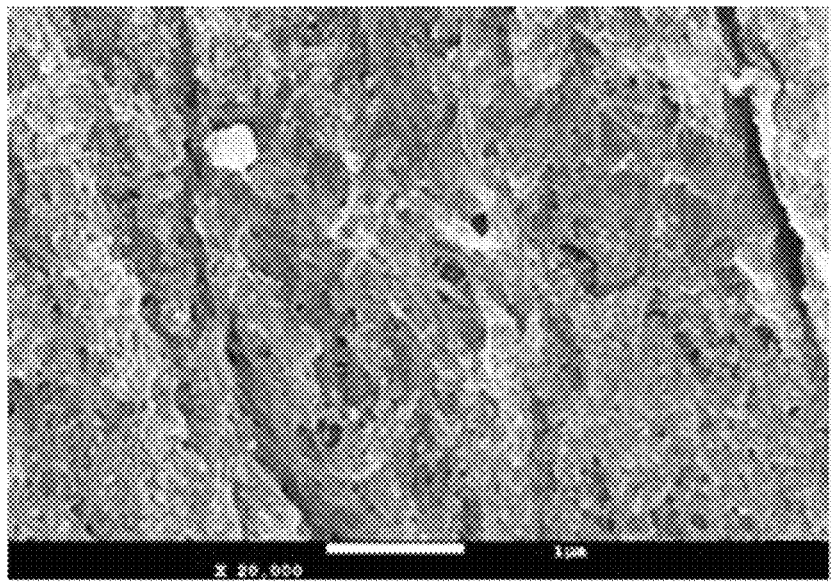

[FIG. 5A]
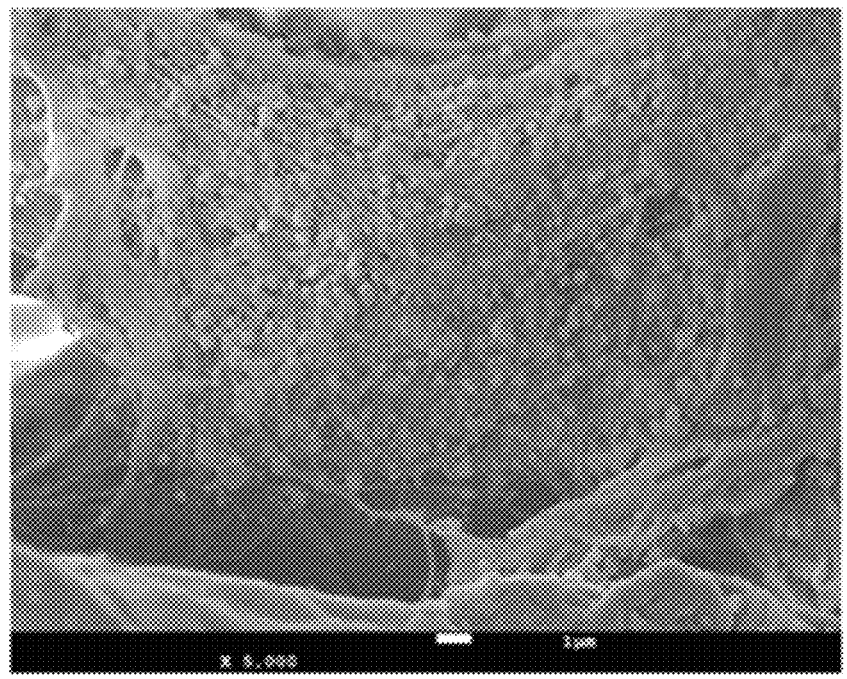
[FIG. 5B]
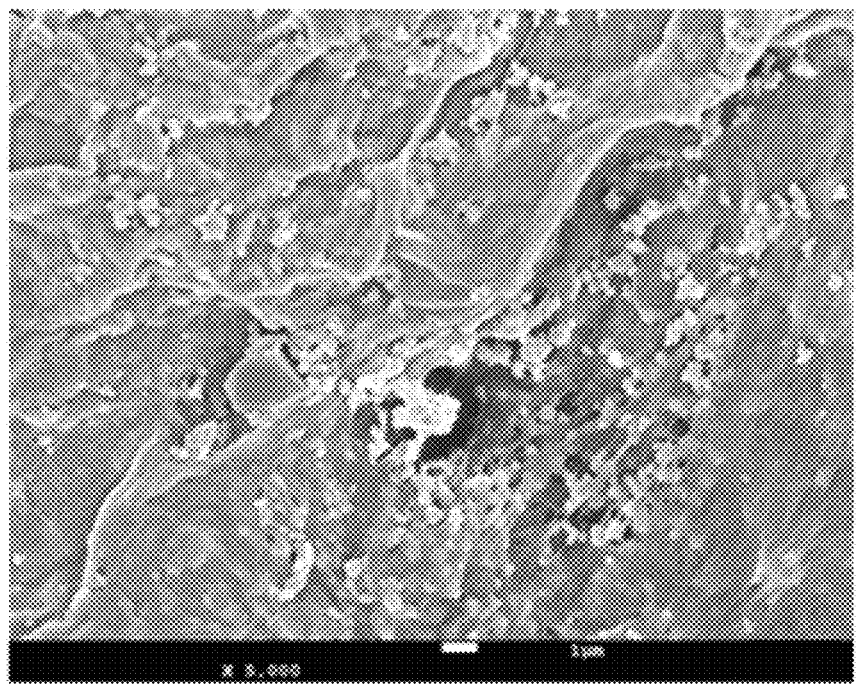

[FIG. 6A]
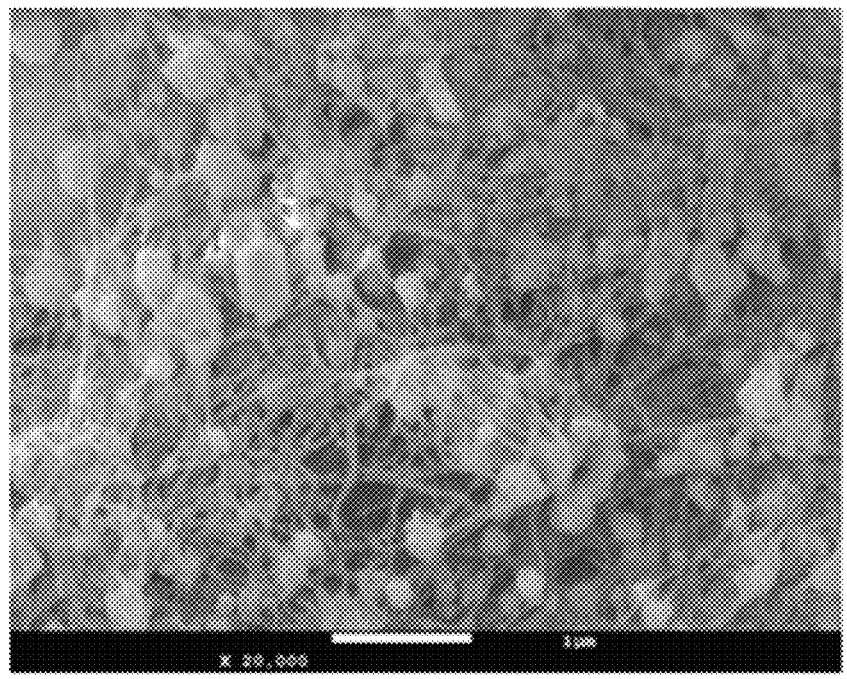
[FIG. 6B]
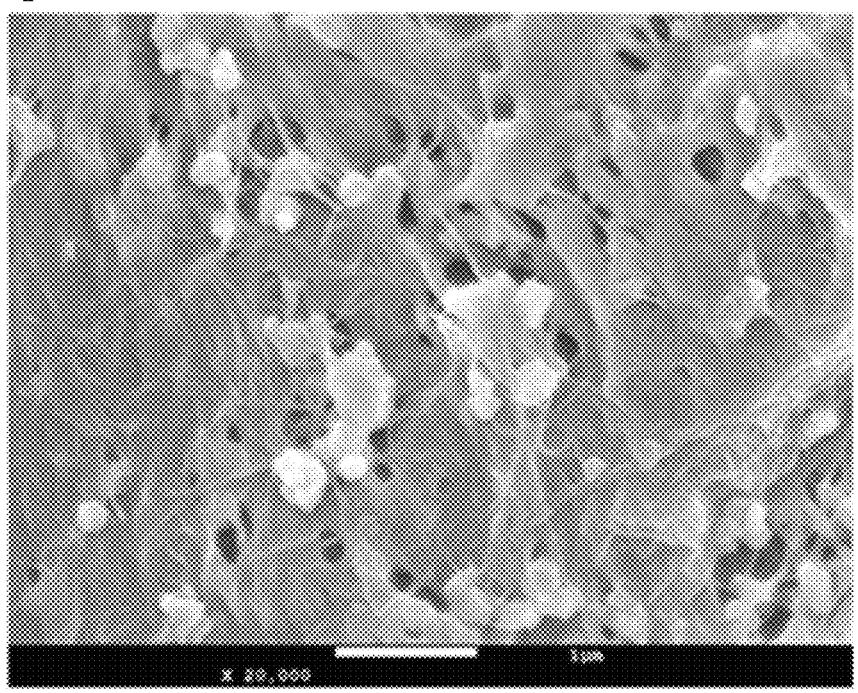

[FIG. 7]
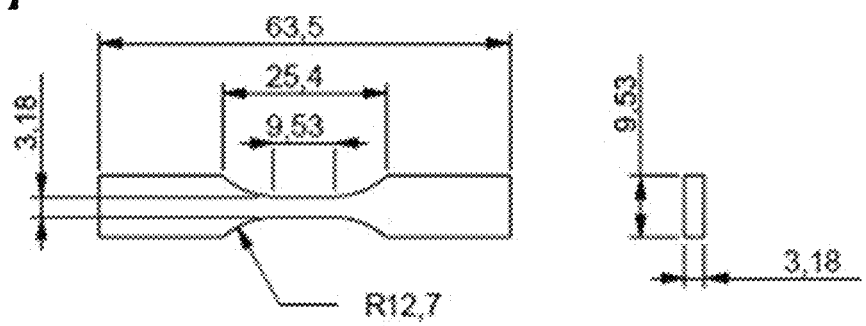

POLYMER COMPLEX

CROSS-REFERENCE TO RELATED APPLICATION(S)

The present application is a national stage entry under 35 U.S.C. § 371 of International Application No. PCT/KR2021/006743 filed on May 31, 2021, which claims priority from Korean Patent Applications No. 10-2020-0065204 filed on May 29, 2020, No. 10-2020-0086346 filed on Jul. 13, 2020, No. 10-2021-0069785 filed on May 31, 2021, No. 10-2021-0069786 filed on May 31, 2021, and No. 10-2021-0069787 filed on May 31, 2021, all the disclosures of which are incorporated herein by reference.

TECHNICAL FIELD

The present disclosure relates to a polymer complex containing microcellulose fibers including nanofibrils and fine particles.

BACKGROUND OF ART

Pulp refers to a lignocellulosic fibrous material obtained by chemically or mechanically separating cellulose fibers from wood, fiber crops, waste paper, rags, or the like. Cellulose fibers are mainly used in the paper industry, and are used as raw materials for nanocellulose.

Nanocellulose is being applied to research to improve physical properties of polymers by complexation with polymers. It is easy to recycle the polymer complex to which environmentally friendly nanocellulose is applied as a reinforcing material, unlike a polymer complex to which glass fiber is applied.

However, the process for producing nanocellulose from cellulose fibers is complicated and costly. In addition, there is a problem in that the cellulose fibers are deteriorated due to a high temperature in the process of complexation with polymers. Further, since the cellulose fibers and nanocellulose are easily aggregated in the polymer complex, it is very difficult to disperse them in the nanoscale, and thus there is a limitation in obtaining a sufficient reinforcing effect.

DETAILED DESCRIPTION OF THE INVENTION

Technical Problem

In the present disclosure, there is provided a polymer complex capable of exhibiting excellent mechanical properties while being environmentally friendly by including cellulose fibers as a reinforcing material.

Technical Solution

Hereinafter, the polymer complex according to embodiments of the present invention will be described.

The terms are used merely to refer to specific embodiments, and are not intended to restrict the present disclosure unless it is explicitly expressed.

Singular expressions of the present disclosure may include plural expressions unless they are differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

As used herein, 'nanofiber' or 'nanofibril' refers to a fiber having a minor axis diameter in the nanometer range, and 'microfiber' refers to a fiber having a minor axis diameter in the micrometer range. For example, the microfiber may be composed of a bundle of the nanofibers.

As used herein, 'pulp' refers to a lignocellulosic fibrous material obtained by chemically or mechanically separating cellulose fibers from wood, fiber crops, waste paper, rags, or the like.

As used herein, 'pulp fiber', 'cellulose fiber' or 'microcellulose fiber' refers to a microfiber made of cellulose. As used herein, 'cellulose nanofiber' refers to a nanofiber made of cellulose.

As used herein, 'fibrillation' refers to a phenomenon in which nanofibrils forming the internal structure of microcellulose fibers are released and raised like fluff on the microcellulose fibers.

As used herein, 'fibrillated cellulose fiber' refers to a microcellulose fiber in a state in which nanofibrils having a minor axis diameter in the nanometer range are raised like fluff on the microcellulose fiber by the fibrillation.

According to an embodiment of the present disclosure, there is provided a polymer complex containing microcellulose fibers including nanofibrils and fine particles; and a polymer matrix including a polyester resin.

Cellulose nanofibers, which are biodegradable and environmentally friendly natural polymer materials, have recently attracted attention as a reinforcing material for plastics. However, the process of obtaining nanofibers by nanosizing (miniaturizing) microcellulose fibers is complicated and costly, resulting in a problem of increasing the cost of a polymer complex containing cellulose nanofibers as a reinforcing material.

As a result of continuous research by the present inventors, it was confirmed that when the microcellulose fibers are fibrillated by growing fine particles on the microcellulose fibers without nanoizing the microcellulose fibers, and then complexed with a polymer matrix, excellent mechanical properties equivalent to those to which cellulose nanofibers are applied could be exhibited. In addition, it was confirmed that various physical properties could be expressed from the fine particles included on the microcellulose fibers. Furthermore, it was confirmed that the polymer complex could exhibit excellent mechanical properties while being environmentally friendly by applying a polyester resin as the polymer matrix. Such a polymer complex can have a wide spectrum of mechanical properties depending on the content of the polymer matrix, and it is expected that the polymer complex can be used in various field.

The polymer complex contains microcellulose fibers including nanofibrils and fine particles; and a polymer matrix including a polyester resin.

Preferably, the polymer complex contains the polymer matrix and the microcellulose fibers dispersed in the polymer matrix, and the microcellulose fibers include nanofibrils and microparticles.

The polymer matrix includes a polyester resin. Preferably, the polymer matrix may include an aliphatic-aromatic copolyester resin.

Specifically, the polymer matrix may include at least one selected from the group consisting of poly(ethylene adipate-co-terephthalate), poly(butylene adipate-co-terephthalate), poly(ethylene succinate-co-terephthalate), poly(butylene succinate-co-terephthalate), poly(ethylene adipate-co-succinate-co-terephthalate), and poly(butylene adipate-co-succinate-co-terephthalate). Preferably, poly(butylene adipate-co-terephthalate) may be used as the polymer matrix.

The polymer matrix is biodegradable, thereby exhibiting excellent mechanical properties while being environmentally friendly. In particular, the polymer matrix can exhibit high elastic modulus and strength, so that the polymer complex can be used in a variety of ways from soft materials to hard materials.

For the expression of the above properties, the polymer matrix preferably has a density of 1.0 g/ml to 2.0 g/ml, or 1.2 g/ml to 1.5 g/ml; and a melt flow rate (190° C., load 2160 g) of 2.0 g/10 min to 4.0 g/10 min, or 2.5 g/10 min to 3.5 g/10 min.

The microcellulose fibers may be natural cellulose fibers obtained from wood such as softwoods or hardwoods. For example, the microcellulose fibers may be pulp fibers obtained by dissolving components other than cellulose from natural raw materials such as softwoods or hardwoods using caustic soda or sodium sulfate.

In general, fibrillation of microcellulose fibers means a phenomenon in which relatively large fibrils forming a membrane of cellulose fibers and their internal tissues are released through a process such as beating, and fine fibrils are formed on the surface like fluff.

In the present disclosure, the microcellulose fibers including nanofibrils and fine particles may be a fiber in which some of the fibrils forming the microcellulose fibers are released by the growth of the fine particles.

FIG. 1A is an enlarged schematic view of microcellulose fibers, and FIG. 1B is an enlarged schematic view of microcellulose fibers including nanofibrils and fine particles.

In FIG. 1A, the microcellulose fiber 100 is a fiber having a minor axis diameter in the micrometer range. Referring to FIG. 1B, when fine particles are grown on the microcellulose fibers, some of the fibrils forming the microcellulose fibers 100 are released by the growth of the fine particles 20, thereby forming a fiber in which nanofibrils 11 are raised on the microcellulose fibers 100' like fluff. Also, the nanofibrils 11 may be present inside the microcellulose fibers 100' through fibrillation by the growth of the fine particles 20.

For example, the microcellulose fibers include nanofibrils and fine particles. Herein, the nanofibrils may be bonded to a surface of the microcellulose fibers. In addition, the nanofibrils may be present inside the microcellulose fibers. In addition, the fine particles may be bonded to the nanofibrils or bonded to a surface or inside of the microcellulose fibers.

In the microcellulose fibers including nanofibrils and fine particles, the microcellulose fibers may have a minor axis diameter of 1 µm or more; and 30 µm or less, 25 µm or less, 20 µm or less, 15 µm or less, or 10 µm or less. Specifically, the microcellulose fibers may have a minor axis diameter of 1 µm to 30 µm, 1 µm to 25 µm, 1 µm to 20 µm, 1 µm to 15 µm, or 1 µm to 10 µm.

And, in the microcellulose fibers including nanofibrils and fine particles, the nanofibrils may have a minor axis diameter of 10 nm or more, 20 nm or more, 30 nm or more, 50 nm or more, or 50 nm or more; and 400 nm or less, 350 nm or less, 300 nm or less, 250 nm or less, 200 nm or less, 150 nm or less, or 100 nm or less. Specifically, the nanofibrils may have a minor axis diameter of 10 nm to 400 nm, 10 nm to 350 nm, 10 nm to 300 nm, 20 nm to 300 nm, 20 nm to 250 nm, 30 nm to 250 nm, 30 nm to 200 nm, 40 nm to 200 nm, 40 nm to 150 nm, 50 nm to 150 nm, or 50 nm to 100 nm.

The microcellulose fibers including nanofibrils and fine particles may be prepared by adding a reducing agent, a catalyst, a ligand, or a mixture thereof to a mixture containing microcellulose fibers, a fine particle precursor, and a solvent to grow fine particles from the fine particle precursor distributed on the cellulose fibers.

For example, in the above process, a mixture containing microcellulose fibers, a fine particle precursor and a solvent is prepared.

An appropriate solvent capable of dissolving the fine particle precursor and swelling the microcellulose fibers may be used as the solvent. For example, water, alcohol (e.g., lower alcohol such as methanol, ethanol, propanol or butanol), dimethyl sulfoxide (DMSO), sodium hydroxide solution, ammonia solution, urea solution, or a mixture thereof may be used.

The solvent may be used in an amount of 1000 parts by weight to 10000 parts by weight based on 100 parts by weight of the microcellulose fibers. Within this range, the microcellulose fibers are sufficiently swollen, and fluidity of the fine particle precursor is ensured, so that the fine particle precursor can be uniformly dispersed on the microcellulose fibers.

It is possible to provide polymer complexes having various physical properties depending on the type of fine particles grown on the microcellulose fibers. That is, the fine particle precursor may be appropriately selected according to physical properties to be imparted to the polymer complex. For example, for the purpose of imparting antibacterial property and heat resistance to the polymer complex, a fine particle precursor capable of growing zinc oxide may be selected.

For example, the fine particles may include at least one element selected from the group consisting of copper, zinc, calcium, aluminum, iron, platinum, palladium, ruthenium, iridium, rhodium, osmium, chromium, cobalt, nickel, manganese, vanadium, molybdenum, and gallium. The components of the fine particles may be one type or two or more types.

The fine particle precursor may be a salt of at least one metal selected from the group consisting of copper, zinc, calcium, aluminum, iron, platinum, palladium, ruthenium, iridium, rhodium, osmium, chromium, cobalt, nickel, manganese, vanadium, molybdenum, and gallium. The salt may be an acetate, chloride, or nitrate. In addition, a silicon oxide precursor such as tetraethyl orthosilicate (TEOS) may be used as the fine particle precursor.

The fine particles may be contained in an amount of 1 to 30 parts by weight based on 100 parts by weight of the microcellulose fibers. Accordingly, the content of the fine particle precursor contained in the mixture may be controlled such that the content of fine particles finally prepared on the microcellulose fibers meet the above range. Within this range, sufficient fibrillation can be induced by uniformly distributing the fine particle precursor to the microcellulose fibers.

The mixture may be prepared by dissolving the fine particle precursor in the solvent, and then adding microcellulose fibers thereto. The mixture is stirred to swell the microcellulose fibers, and at the same time, the fine particle precursor is evenly distributed on the swollen microcellulose fibers. The fine particle precursor may be attached to the microcellulose fibers through hydrogen bonding or ionic bonding.

Herein, the type and content of the reducing agent, catalyst, and ligand contained in the mixture may be appropriately selected according to the added fine particle precursor, and the type and content of the fine particles to be grown. For example, the reducing agent may be sodium hydroxide (NaOH), a metal hydride-based reducing agent, a borohydride-based reducing agent, a borane-based reducing agent, a silane-based reducing agent, a hydrazine-based reducing agent, or a hydrazide-based reducing agent. As the catalyst, ammonia or urea may be used. As the ligand, benzene-1,3,5-tricarboxylate may be used.

FIG. 3 is a scanning electron microscope (SEM) image of microcellulose fibers including nanofibrils and fine particles according to Example 1 below. Referring to FIG. 3, it can be confirmed that fibrillation occurred by the growth of fine particles on the cellulose fibers.

Optionally, after growing the fine particles on the microcellulose fibers, the fine particles may be modified to provide additional physical properties. For example, a process of modifying the fine particles by adding a lipophilic compound having a thiol group after growing the fine particles on the microcellulose fibers may be additionally performed. By modifying the fine particles to be lipophilic, compatibility between the microcellulose fibers and the polymer matrix may be further improved. Examples of the lipophilic compound having a thiol group include 1-decanethiol, 1-undecanethiol, 1-dodecanethiol, 1-tetradecanethiol, 1-pentadecanethiol, 1-hexadecanethiol, 1-octadecanethiol, and the like.

Through the above process, the microcellulose fibers including nanofibrils and fine particles can be obtained.

According to an embodiment of the present disclosure, the fine particles may have a minor axis diameter of 0.01 μm or more, 0.03 μm or more, or 0.05 μm or more; and 10 μm or less, 7 μm or less, or 5 μm or less. Preferably, the fine particles may have a minor axis diameter of 0.01 μm to 10 μm, 0.03 μm to 7 μm, or 0.05 μm to 5 μm.

When the diameter of the fine particles included in the microcellulose fibers is too large, the fine particles may act as defects, thereby reducing mechanical properties of the polymer complex. Thus, the diameter of the fine particles is preferably 10 μm or less, 7 μm or less, or 5 μm or less.

In addition, for sufficient fibrillation of the microcellulose fibers by the growth of fine particles, the diameter of the fine particles is preferably 0.01 μm or more, 0.03 μm or more, or 0.05 μm or more.

The fine particles may be spherical particles having a diameter of 0.01 μm to 10 μm. In addition, the fine particles may be columnar particles having a diameter of 0.01 μm to 10 μm on one axis and a diameter of 0.02 μm to 30 μm on another axis.

The diameter of the fine particles may be measured using a scanning electron microscope. As a non-limiting example, the diameters, minor axis diameters, or major axis diameters of 20 fine particles are measured using a scanning electron microscope, respectively, and then an average value calculated by excluding the maximum and minimum values is obtained.

Preferably, the microcellulose fibers include fine particles having a particle diameter of 0.01 μm to 10 μm, and nanofibrils having a minor axis diameter of 10 nm to 400 nm are formed on the microcellulose fibers having a minor axis diameter of 1 μm to 30 μm.

According to an embodiment of the present disclosure, the fine particles may be included in an amount of 1 part by weight or more, 5 parts by weight or more, 8 parts by weight or more, or 10 parts by weight or more; and 30 parts by weight or less, 25 parts by weight or less, or 20 parts by weight or less based on 100 parts by weight of the microcellulose fibers. Preferably, the fine particles may be included in an amount of 1 to 30 parts by weight, 5 to 30 parts by weight, 5 to 25 parts by weight, 8 to 25 parts by weight, 10 to 25 parts by weight, or 10 to 20 parts by weight based on 100 parts by weight of the microcellulose fibers.

In order to sufficiently express the fibrillation effect of the microcellulose fibers by the growth of fine particles, the fine particles are preferably included in an amount of 1 part by weight or more, 5 parts by weight or more, or 10 parts by weight or more based on 100 parts by weight of the microcellulose fibers.

However, when the fine particles are included in an excessive amount on the microcellulose fibers, compatibility with the polymer matrix may be reduced, and thus mechanical properties of the polymer complex may be deteriorated. In addition, when the fine particles are included in an excessive amount, the fine particles are aggregated to form a non-uniform aggregate, and thus various physical properties may be deteriorated. Therefore, the fine particles are preferably included in an amount of 30 parts by weight or less, 25 parts by weight or less, or 20 parts by weight or less based on 100 parts by weight of the microcellulose fibers.

According to an embodiment of the present disclosure, the polymer complex may contain 60 to 95 wt % of the polymer matrix; and 5 to 40 wt % of the microcellulose fibers.

Preferably, the polymer complex may contain 65 to 95 wt % of the polymer matrix; and 5 to 35 wt % of the microcellulose fibers.

More preferably, the polymer complex may contain 70 to 95 wt % of the polymer matrix; and 5 to 30 wt % of the microcellulose fibers.

In order to provide a polymer complex containing an appropriate amount of the matrix, the polymer matrix is preferably contained in the polymer complex in an amount of 60 wt % or more, 65 wt % or more, or 70 wt % or more. In addition, for the expression improved reinforcing effect according to the present disclosure, the polymer matrix is preferably contained in the polymer complex in an amount of 95 wt % or less. For the expression of improved reinforcing effect according to the present disclosure, the microcellulose fibers including nanofibrils and fine particles are preferably contained in the polymer complex in an amount of 5 wt % or more. However, an excessive amount of the reinforcing material may impair compatibility with the polymer matrix, thereby reducing mechanical properties of the polymer complex. Therefore, it is preferable that the microcellulose fibers including nanofibrils and fine particles are contained in the polymer complex in an amount of 40 wt % or less, 35 wt % or less, or 30 wt % or less.

Meanwhile, the polymer complex may further include a compatibilizer dispersed on the polymer matrix. The compatibilizer is a component that helps the polymer matrix and the microcellulose fibers to be well blended with each other.

As the compatibilizer, those known in the art to which the present invention pertains may be used in consideration of the specific type of the polymer matrix.

Preferably, the compatibilizer may be a modified polyolefin. The modified polyolefin refers to a resin obtained by modifying a polyolefin with an unsaturated carboxylic acid or a derivative thereof.

The polyolefin forming the modified polyolefin may be a chain-type olefin such as ethylene, propylene, butene, pentene, hexene, and heptene; a cyclic olefin such as cyclopentene, cyclohexene, and 1,3-cyclopentadiene; an olefin substituted with an aromatic ring such as styrene, or the like.

The unsaturated carboxylic acid forming the modified polyolefin may include fumaric acid, maleic acid, itaconic acid, citraconic acid, aconitic acid, and anhydrides thereof.

As a non-limiting example, the modified polyolefin may be polypropylene or polyethylene in which 0.1 to 10 wt % thereof is grafted with maleic anhydride.

The modified polyolefin may further improve compatibility of cellulose fibers with a polymer matrix, thereby further improving mechanical properties of the polymer complex.

The compatibilizer may be contained in the polymer complex in an amount of 0.1 to 15 wt %. In order to allow proper compatibility to be expressed, the compatibilizer may be contained in the polymer complex in an amount of 0.1 wt % or more, 1 wt % or more, or 5 wt % or more. However, an excessive amount of the compatibilizer may deteriorate mechanical properties of the polymer complex.

Therefore, the compatibilizer is preferably contained in the polymer complex in an amount of 15 wt % or less.

According to an embodiment of the present disclosure, the polymer complex may be obtained by mixing the above-mentioned components in a mixer, followed by curing. As a non-limiting example, the polymer complex can be obtained by mixing the above-mentioned components in a batch mixer at 100 to 180° C., preparing a master batch in the form of pellets, and injecting the master batch into an extruder for extrusion and injection.

According to an embodiment of the present disclosure, the polymer complex may exhibit excellent mechanical properties while being environmentally friendly by containing the microcellulose fibers including nanofibrils and fine particles.

For example, the polymer complex may have yield strength of 8 MPa or more, 9 MPa or more, or 10 MPa or more; and 30 MPa or less, 27 MPa or less, or 25 MPa or less, when measured according to ASTM D638-5 for a dog-bone-shaped specimen (or a dumbbell-shaped specimen; see FIG. 7) prepared from the polymer complex according to ASTM D638-5. Preferably, the polymer complex may have yield strength of 8 MPa to 30 MPa, 9 MPa to 30 MPa, 9 MPa to 27 MPa, 10 MPa to 27 MPa, or 10 MPa to 25 MPa.

As another example, the polymer complex may have tensile strength of 15 MPa or more, 16 MPa or more, or 16.5 MPa or more; and 30 MPa or less, 27 MPa or less, or 25 MPa or less, when measured according to ASTM D638-5 for a dog-bone-shaped specimen prepared from the polymer complex according to ASTM D638-5. Preferably, the polymer complex may have tensile strength of 15 MPa to 30 MPa, 16 MPa to 30 MPa, 16 MPa to 27 MPa, 16.5 MPa to 27 MPa, or 16.5 MPa to 25 MPa.

As another example, the polymer complex may have elastic modulus of 120 MPa or more, 130 MPa or more, or 140 MPa or more; and 800 MPa or less, 790 MPa or less, or 785 MPa or less, when measured according to ASTM D638-5 for a dog-bone-shaped specimen prepared from the polymer complex according to ASTM D638-5.

Preferably, the polymer complex may have elastic modulus of 120 MPa to 800 MPa, 130 MPa to 800 MPa, 130 MPa to 790 MPa, 140 MPa to 790 MPa, or 140 MPa to 785 MPa.

ASTM D638 provides a standard test method for determining the tensile properties of plastics. The tensile properties of the polymer complex are measured according to specimen Type V of ASTM D638. ASTM D638 is performed by applying a tensile force to the specimen and measuring the tensile properties of the specimen under stress. This may be performed at a constant tensile rate in the range of 1 to 500 mm/min until the specimen is broken (yield or fractured) using a conventional tensile testing machine. The tensile strength is the amount of force that can be applied until the specimen yields or breaks.

The polymer complex can exhibit improved mechanical properties while being environmentally friendly, and thus can be applied to various uses such as lightweight materials for automobiles, home appliances, and packaging materials.

Advantageous Effects

According to the present disclosure, there is provided a polymer complex capable of exhibiting excellent mechanical properties while being environmentally friendly by containing cellulose fibers as a reinforcing material. The polymer complex may exhibit improved mechanical properties while maintaining intrinsic properties of the polymer despite containing non-nanosized cellulose fibers. In particular, the microcellulose fibers including nanofibrils and fine particles are evenly dispersed in the polymer matrix without going through a complicated and expensive nano-processing, making it possible to provide a high-quality polymer complex economically and efficiently. The polymer complex may exhibit additional properties such as antibacterial property in addition to mechanical properties depending on the type of fine particles included in the microcellulose fibers.

BRIEF DESCRIPTION OF THE DRAWINGS

FIG. 1A is an enlarged schematic view of microcellulose fibers, and FIG. 1B is an enlarged schematic view of microcellulose fibers including nanofibrils and fine particles.

FIG. 2 is a scanning electron microscope (SEM) image of pulp fibers used in Example 1.

FIG. 3 is a SEM image of microcellulose fibers including nanofibrils and fine particles obtained in Example 1.

FIG. 4 is a SEM image of microcellulose fibers including nanofibrils and fine particles obtained in Example 2.

FIG. 5A shows a comparison of SEM images of fibrillated microcellulose fibers according to Example 1, and FIG. 5B shows a comparison of SEM images of miniaturized cellulose complexed with fine particles according to Comparative Example 4.

FIG. 6A is a comparison of SEM images of FIG. 5A taken at a higher magnification, and FIG. 6B is a comparison of SEM images of FIG. 5B taken at a higher magnification.

FIG. 7 shows specifications of a dog-bone-shaped specimen (or a dumbbell-shaped specimen) for measuring tensile strength according to Type V of ASTM D638 (unit: mm).

DESCRIPTION OF SYMBOLS

100, 100': microcellulose fiber

11: nanofibril

20: fine particle

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

Example 1

1) Preparation of Microcellulose Fibers Including Nanofibrils and Fine Particles Softwood kraft pulp fibers (cellulose fibers) were prepared as cellulose raw materials. Then, the shape of the pulp was observed using a scanning electron microscope (SEM image of FIG. 2).

20 g of the above pulp fibers were added to an aqueous solution in which 20 g of zinc acetate was dissolved in 1000 g of distilled water, and stirred at 500 rpm for 2 hours to prepare a mixture. In this mixture, zinc acetate was attached to the swollen pulp fibers through hydrogen bonding or ionic bonding.

3.6 g of sodium hydroxide (NaOH) was added to the mixture at room temperature, and stirred at 500 rpm for 2 hours to grow fine particles on the pulp fibers. As shown in FIG. 3, FIG. 5A and FIG. 6A, it was confirmed using a scanning electron microscope that fibrillation occurred in the pulp fiber portion on which particles (ZnO) were grown.

By the above method, microcellulose fibers including nanofibrils and fine particles were obtained.

2) Preparation of Polymer Complex 5 wt % of microcellulose fibers including nanofibrils and fine particles, and 95 wt % of poly(butylene adipate-co-terephthalate) were added to a batch mixer, and mixed at 170° C. for 20 minutes to prepare a master batch in the form of pellets. As the poly(butylene adipate-co-terephthalate), Solpol 1000N (MFI 3 g/10 min, density 1.26 g/ml) manufactured by SOLTECH was used.

The master batch was put into a twin-screw extruder to perform a compounding process, and then extruded. The polymer complex thus obtained was put back into an injection machine and injected, and a dog-bone-shaped specimen according to Type V of ASTM D638 (see FIG. 7) was prepared.

Example 2

1) Preparation of Microcellulose Fibers Including Nanofibrils and Fine Particles 20 g of the same pulp fibers as in Example 1 were added to 1 L of a 0.05 M aqueous solution in which 9.08 g (0.05 mol) of copper acetate was dissolved in distilled water, and stirred at 500 rpm for 2 hours to prepare a mixture. In this mixture, copper acetate was attached to the swollen pulp fibers through hydrogen bonding or ionic bonding.

0.05 mol of benzene-1,3,5-tricarboxylate (BTC) was added to the mixture at room temperature, and stirred at 500 rpm for 2 hours to grow fine particles on the pulp fibers. As shown in FIG. 4, it was confirmed using a scanning electron microscope that fibrillation occurred in the pulp fiber portion on which particles (HKUST-1: Cu-BTC) were grown.

By the above method, microcellulose fibers including nanofibrils and fine particles were obtained.

2) Preparation of Polymer Complex 5 wt % of microcellulose fibers including nanofibrils and fine particles, and 95 wt % of poly(butylene adipate-co-terephthalate) were added to a batch mixer, and mixed at 170° C. for 20 minutes to prepare a master batch in the form of pellets. As the poly(butylene adipate-co-terephthalate), Solpol 1000N (MFI 3 g/10 min, density 1.26 g/ml) manufactured by SOLTECH was used.

The master batch was put into a twin-screw extruder to perform a compounding process, and then extruded. The polymer complex thus obtained was put back into an injection machine and injected, and a dog-bone-shaped specimen according to Type V of ASTM D638 (see FIG. 7) was prepared.

Example 3

A polymer complex and a specimen were prepared in the same manner as in Example 1, except that the content ratio of the microcellulose fibers including nanofibrils and fine particles, and the poly(butylene adipate-co-terephthalate) was changed to 20:80 (wt %).

Example 4

A polymer complex and a specimen were prepared in the same manner as in Example 1, except that the content ratio of the microcellulose fibers including nanofibrils and fine particles, and the poly(butylene adipate-co-terephthalate) was changed to 30:70 (wt %).

Comparative Example 1

A specimen was prepared in the same manner as in Example 1 using poly(butylene adipate-co-terephthalate), except that the microcellulose fibers including nanofibrils and fine particles were not added. The specimen is a neat polymer specimen.

Comparative Example 2

1) Preparation of Miniaturized Cellulose Fibers Including Fine Particles

The same softwood kraft pulp fibers as in Example 1 were prepared as cellulose raw materials. A surface of the pulp fibers was oxidized using 2,2,6,6-tetramethylpiperidinyl-1-oxyradical (TEMPO) as a catalyst to obtain oxidized pulp.

1 g of the oxidized pulp was dispersed in 99 g of distilled water and miniaturized (defibrated) with a mixer for 30 minutes to obtain an aqueous dispersion of miniaturized cellulose at a concentration of 1%.

A zinc acetate aqueous solution was prepared by dissolving 20 g of zinc acetate in 1000 g of distilled water. 3.6 g of sodium hydroxide (NaOH) was dissolved in 10 ml of distilled water to prepare a sodium hydroxide solution.

While stirring 100 g of the aqueous dispersion of miniaturized cellulose at 15° C., 50 ml of the zinc acetate aqueous solution and 10 ml of the sodium hydroxide solution were added thereto, followed by stirring at 500 rpm for 2 hours to prepare a complex of zinc oxide (ZnO) particles and miniaturized cellulose.

As shown in FIG. 5B and FIG. 6B, it was confirmed using a scanning electron microscope that the complex of zinc oxide particles and miniaturized cellulose according to Comparative Example 4 had strong bonding strength and aggregation between the miniaturized celluloses, so that nanofibers were aggregated and the dispersion degree of particles was low.

2) Preparation of Polymer Complex

A polymer complex and a specimen was prepared in the same manner as in Example 1, except that a complex of zinc oxide (ZnO) particles and miniaturized cellulose was used instead of the microcellulose fibers including nanofibrils and fine particles.

Test Examples

The physical properties of the specimens prepared in Examples and Comparative Examples were evaluated by the following method, and the results are shown in Table 1 below.

1) Minor Axis Diameter of Fiber

The minor axis diameter of the microcellulose fibers (the shortest diameter in the cross section of fiber) prepared in Examples was measured using a scanning electron microscope.

Specifically, in the case of microcellulose fibers, the minor axis diameters of 10 microfibers per each sample were measured and displayed in a range excluding the maximum and minimum values. In the case of nanofibrils, the minor axis diameters of nanofibrils per each sample were measured, and displayed in a range excluding the maximum and minimum values.

In addition, in Comparative Example 2, the pulp fibers were miniaturized (defibrated), and then complexed with particles unlike Examples. The minor axis diameter of nanofibrils of Comparative Example 2 in Table 1 below means the minor axis diameter of the miniaturized cellulose after complexing with particles.

2) Tensile Test

The following specimen (FIG. 7) was prepared according to the standard of specimen Type V of ASTM D638. The specimen was left for 24 hours in a constant temperature and humidity room adjusted to a temperature of 23° C. and a relative humidity of 50%, and then subjected to a tensile test.

The yield strength, tensile strength and elastic modulus of the specimen was measured according to ASTM D638 using a universal testing machine (UTM) manufactured by Instron. In accordance with ASTM D638, a gap between the grips holding the specimen at both ends was set to 25.4 mm, and the test was performed at a constant tensile rate with a crosshead speed of 5 mm/min.

TABLE 1

| | Minor axis diameter | | Size of fine | Yield | Tensile | Elastic |
|---|---|---|---|---|---|---|
| | Microcellulose fibers (μm) | Nanofibrils (nm) | particles (μm) | strength (MPa) | strength (GPa) | modulus (MPa) |
| Example 1 | 1~10 | 50~100 | 0.1~1 | 10.4 | 16.5 | 150 |
| Example 2 | 1~10 | 50~100 | 0.05~0.1 | 10.2 | 16.5 | 150 |
| Example 3 | 1~10 | 50~100 | 0.1~1 | 13.9 | 17.5 | 220 |
| Example 4 | 1~10 | 50~100 | 0.1~1 | 24.6 | 24.6 | 780 |
| Comparative Example 1 | None | None | None | 8.5 | 22.2 | 90 |
| Comparative Example 2 | None | 10~100 | 0.1~1 | 9.8 | 14.0 | 125 |

Referring to Table 1, it was confirmed that the specimens of Examples could exhibit equivalent or higher mechanical properties compared to the specimens of Comparative Examples. In particular, Examples exhibited a behavior in which the yield strength and the tensile strength become similar as the content ratio of the microcellulose fibers increases. This behavior is caused by an increase in elastic deformation and a decrease in plastic deformation. That is, as the content ratio of the microcellulose fibers increases, ductility decreases and hardening proceeds, so that they can be used as a hard eco-friendly material.

In the cellulose fibers prepared in Comparative Example 2, although the particles were grown on the miniaturized cellulose, re-aggregation of the miniaturized cellulose and the particles occurred excessively when complexed with the polymer matrix. The specimen of Comparative Example 2, which showed low dispersibility due to the re-aggregation, exhibited relatively poor mechanical properties.

The invention claimed is:

1. A polymer complex comprising microcellulose fibers; and a polymer matrix,
   wherein the microcellulose fibers comprise nanofibrils and fine particles, and the microcellulose fibers are fibrillated by growth of the fine particles on the microcellulose fibers,
   wherein the polymer matrix comprises a polyester resin,
   wherein the nanofibrils are bonded to a surface of the microcellulose fibers, and the fine particles are bonded to the nanofibrils or bonded to the surface or inside of the microcellulose fibers, and
   wherein the fine particles are particles with a minor axis diameter of 0.01 μm to 10 μm.

2. The polymer complex of claim 1,
   wherein the fine particles comprise one or more metal particles of copper, zinc, calcium, aluminum, iron, silver, platinum, palladium, ruthenium, iridium, rhodium, osmium, chromium, cobalt, nickel, manganese, vanadium, molybdenum, magnesium, strontium, titanium, zirconium, hafnium, and gallium, or silicon oxide particles.

3. The polymer complex of claim 1,
   wherein the fine particles are included in an amount of 1 to 30 parts by weight based on 100 parts by weight of the microcellulose fibers.

4. The polymer complex of claim 1,
   wherein the fine particles comprise spherical fine particles having a diameter of 0.01 μm to 10 μm, columnar particles having a diameter of 0.01 μm to 10 μm on one axis and a diameter of 0.02 μm to 30 μm on another axis, or a mixture thereof.

5. The polymer complex of claim 1,
   wherein the microcellulose fibers have a minor axis diameter of 1 μm to 30 μm, and the nanofibrils have a minor axis diameter of 10 nm to 400 nm.

6. The polymer complex of claim 1,
   wherein the polymer matrix is an aliphatic-aromatic copolyester resin.

7. The polymer complex of claim 1,
   wherein the polymer matrix comprises at least one of poly(ethylene adipate-co-terephthalate), poly(butylene adipate-co-terephthalate), poly(ethylene succinate-co-terephthalate), poly(butylene succinate-co-terephthalate), poly(ethylene adipate-co-succinate-co-terephthalate), or poly(butylene adipate-co-succinate-co-terephthalate).

8. The polymer complex of claim 1,
   wherein the polymer complex contains 60 to 95 wt % of the polymer matrix; and 5 to 40 wt % of the microcellulose fibers.

9. The polymer complex of claim 1,
further comprising a compatibilizer.

10. The polymer complex of claim 1,
which has a yield strength measured according to ASTM D638-5 of 8 MPa to 30 MPa.

11. The polymer complex of claim 1,
which has a tensile strength measured according to ASTM D638-5 of 15 MPa to 30 MPa.

12. The polymer complex of claim 1,
which has an elastic modulus measured according to ASTM D638-5 of 120 MPa to 800 MPa.

13. The polymer complex of claim 8,
wherein the compatibilizer is a modified polyolefin.

14. The polymer complex of claim 13,
wherein the modified polyolefin is polypropylene or polyethylene in which 0.1 to 10 wt % thereof is grafted with maleic anhydride.

15. The polymer complex of claim 8,
wherein the compatibilizer is contained in the polymer complex in an amount of 0.1 to 15 wt %.

* * * * *